United States Patent

[11] 3,595,476

| [72] | Inventor | Milton Eaton<br>363 Ninth Street, Shawinigan, Quebec, Canada |
|---|---|---|
| [21] | Appl. No. | 843,134 |
| [22] | Filed | July 18, 1969 |
| [45] | Patented | July 27, 1971 |
| [32] | Priority | July 19, 1968 |
| [33] | | Canada |
| [31] | | 025,670 |

[54] HTW HEATING SYSTEMS
7 Claims, 4 Drawing Figs.

[52] U.S. Cl. .................................................. 237/8, 237/9
[51] Int. Cl. .................................................. F24d 3/04
[50] Field of Search .................................... 237/1, 8, 9, 67, 13

[56] References Cited
UNITED STATES PATENTS

| 2,130,927 | 9/1938 | Nobis ........................... | 237/1 |
| 2,131,901 | 10/1938 | Parkton ......................... | 237/67 |
| 3,147,797 | 9/1964 | Miner ........................... | 237/8 X |

*Primary Examiner*—Edward J. Michael
*Attorney*—Alan Swabey

ABSTRACT: A system is provided for obtaining steam directly from an HTW heating system for heating the upper levels of high buildings. The system comprises a source of high-temperature water, means for separating said water into a steam portion and a hot water portion, means for heating spaces of the upper levels of the said building with said steam portion and means for heating spaces of the lower levels with said hot water portion, means for controlling the temperature of said heated spaces and means for returning the said water to said system.

PATENTED JUL 27 1971

3,595,476

INVENTOR
Milton EATON

Alan Swabey
ATTORNEY

HTW HEATING SYSTEMS

BACKGROUND OF THE INVENTION

This invention relates to improvements in high-temperature water heating systems, hereinafter referred to as HTW heating systems.

Although HTW is more advantageous than steam as a medium of heat transfer for central heating systems, steam at low pressures is used in preference to hot water for heating high-rise buildings in order to limit static pressures, thereby precluding the hazard associated with hot water at high pressure and permitting the use of standard 125-pound piping and fittings in the heating system throughout the building.

OBJECT OF THE INVENTION

This invention provides means for obtaining steam directly from an HTW heating system for heating the upper levels of high-rise buildings, thus obtaining the advantages of steam heating for these spaces without having to use a primary steam-heating system.

It is the principal object of the invention to provide automatic means for taking high-temperature water from an HTW heating system, dividing it in fixed proportion with respect to B.t.u. values directly into steam and hot water, using the steam for heating the upper levels and the hot water for heating the lower levels of a high-rise building, controlling the temperature of the heated spaces, and returning the water to the heating system after it has performed its heating function.

BRIEF DESCRIPTION OF THE DRAWINGS

The present invention will be better understood from the following detailed description of preferred embodiments of it, reference being made to the accompanying drawings in which.

DESCRIPTION OF PREFERRED EMBODIMENTS

Figures 1, 2, 3, 4:
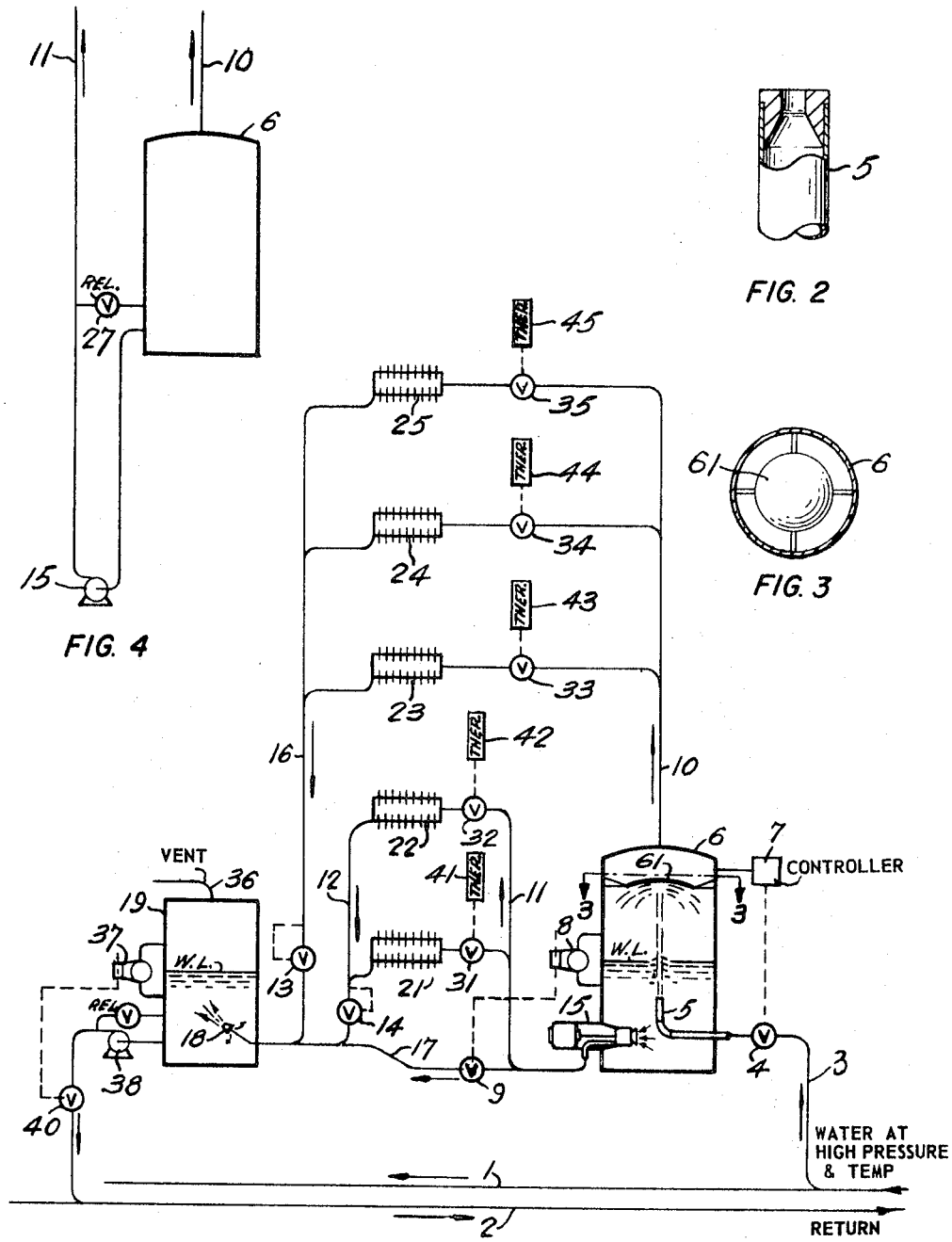
FIG. 1 shows schematically the equipment with its arrangement and interconnections.
FIG. 2 represents a detailed view of nozzle 5 in FIG. 1.
FIG. 3 represents a detailed view of section 3-3 of FIG. 1.
FIG. 4 shows an alternative arrangement for pump 15.

Referring to FIG. 1, water at a high temperature and under a pressure greater than the corresponding saturation pressure, is supplied to the heating load through pipeline 1 and returned to the heating plant at a lower temperature through pipeline 2 after it has performed its heating purpose.

FIG. 1 shows schematically equipment of the invention in normal vertical arrangement. For example, parts 23, 24 and 25 represent groups of steam-heating radiators used for heating the upper levels of a high-rise building, and 21 and 22 represent groups of water-heated radiators for heating the lower levels. The number of groups and levels are proportional to the size and height of the building.

HTW is taken from pipeline 1 through pipe connection 3 and discharged into a combined flash tank and steam separator, vessel 6, through control valve 4 and nozzle 5. A dished plate 61 is supported near the top of vessel 6. FIGS. 2 and 3 show the nozzle and dished plate in greater detail. Controller 7 operates control valve 4 to maintain the steam pressure in vessel 6 at a predetermined low value.

Nozzle 5 points upwards from the lower center of vessel 6 and is made with an orifice size that will give the jetted water sufficient velocity, at full heating load, to impinge on dished plate 61. The water falls back towards the bottom of vessel 6 and the flash steam passes upwards around dished plate 61, which functions as a steam separator. The jet of HTW facilitates the release of flash steam resulting from the fall of pressure below the original saturation pressure of the HTW. The proportions of the steam and water derived from the original HTW, and their B.t.u. values, have a direct relation to the original temperature of the HTW and the controlled steam pressure in vessel 6. For example, let us assume the following:

EXAMPLE

1. The HTW in pipeline 1 to be supplied at a controlled temperature of 300° F. and at a pressure greater than the saturation pressure.

2. The steam pressure in vessel 6 to be maintained at 8 p.s.i.g. by controller 7 and control valve 4.

At a temperature of 300° F. the heat of the liquid is 270 B.t.u./lb. Water in vessel 6, with a saturation pressure of 8 p.s.i.g., has a heat content of 203 B.t.u./lb. As HTW from pipeline 1 is discharged into vessel 6 (270—203) or 67 B.t.u./lb. therefore go into flash steam having a latent heat of evaporation of 956 B.t.u./lb., thus producing 67/956 or 0.07 pounds of flash steam.

The steam rises through pipe 10 at a rate regulated by thermostats 43, 44 and 45 with their control valves 33, 34 and 35 to groups of radiators 23, 24 and 25. The condensate from the radiators is discharged into down pipe 16, near the bottom of which is installed a hg. pressure control valve 13 adjusted to maintain a back pressure of about 15 p.s.i.g., thus creating a seal which prevents steam reaching vessel 19. Condensate flows through valve 13 only when the static pressure of the water in pipe 16 plus the steam pressure exceeds 15 p.s.i.g. Assuming the radiators to be designed for a full load steam temperature of 200° F. and that at minimum heating load the steam temperature falls to 76° F., the corresponding steam pressure range is 6 inches to 29 inches hg. vacuum. Allowing 35 feet of water as the controlled back pressure, the column of water in pipe 16 rises to about 70 feet as the radiator steam pressure falls to 29 inches hg. vacuum. Condensate passing through valve 13 enters vessel 19 which is maintained at atmospheric pressure by vent 36.

Water from vessel 6, having a temperature of 235° F., is used for heating the lower part of the building. An immersion-type pump 15 pumps water from vessel 6 through pipe 11 to groups of hot water radiators 21 and 22 at a rate regulated by thermostats 41 and 42 with their control valves 31 and 32. A back pressure control valve 14, adjusted to maintain a back pressure greater than the static head of water plus the saturation pressure of the water, serves to prevent the occurrence of flash steam at the higher levels, and to create a barometric seal limiting the resistance to the flow of the water to pipe friction and the restrictions imposed by the control valves. Water passing through valve 14 is discharged through pipe 17 into vessel 19.

The amount of steam available for heating the upper part of the building is not limited, whereas the amount of hot water available for heating the lower part bears a constant relation to the amount of steam used. For this reason, the heating equipment for the lower part of the building is designed to provide a surplus of water which is discharged through valve 9, pipe 17 and mixing nozzle 18 into vessel 19 in response to liquid level controller 8 which functions to maintain water level WL in vessel 6. The water level WL in vessel 19 is held as indicated by the operation of pump 38, liquid level controller 37 and control valve 40. A relief valve 39 serves to limit the discharge pressure of pump 38. The water is pumped back into the heating system pipeline 2.

In order not to lose steam through vent 36 of vessel 19, the heating equipment is designed to radiate sufficient heat to maintain the temperature of the water in vessel 19 below 200° F.

Referring again to the above example, each pound of water discharged into vessel 6 from pipeline 1 produces 0.07 pounds of flash steam and 0.93 pounds of water. Assuming that at full heating load the latent heat of the steam of 6 inches hg. vacuum is used for space heating, from each pound of HTW (0.07×1,146) or 80 B.t.u. are used for steam heating. Allowing a 10 percent surplus of water to be normally discharged directly into vessel 19 and the temperature of the water, at full heating load, to be reduced in the radiators from 235° F. to 190° F., the heat per pound of HTW used for hot water heating is (0.9×0.93)×(235—190) or 38 B.t.u. The steam radiators supply 80/(38+80)×100 or 68 percent and the hot water radiators 32 percent of the heat required for the building.

At full heating load, from each pound of HTW, 0.07 pounds of condensate at 200° F., 0.84 pounds of water from the hot water radiators at 190° F. and 0.09 pounds of surplus water at 235° F. enter vessel 19, obtaining a mixture having a temperature of 195° F. Assuming that at minimum heating load the temperature of all radiators is 76° F., the heat supplied by each pound of steam will have increased from 977 to 1,051 B.t.u. (7.6 percent) and the heat supplied by each pound of hot water will have increased from (235−190) to (235−76) or by 350 percent. The amount of hot water required per pound of HTW for the same heating service is reduced to 0.84/3.5 or 0.24 pounds. Of this reduction 7.6 percent of 0.84 pounds, or 0.06 pounds, is owing to the corresponding decrease in the demand for steam. From each pound of HTW, therefore, 0.07 pounds of steam and 0.30 pounds of hot water are used, leaving 0.63 pounds of surplus water. At minimum heating load, from each pound of HTW 0.07 pounds of condensate at 76° F., 0.30 pounds of water from the hot water radiators at 76° F. and 0.63 pounds of surplus water at 235° F. enter vessel 19, obtaining a mixture having a temperature of 176° F. There is therefore no steam lost through vent 36. Permanent gases and some vapor, however, escape through the vent. The vapor loss is included with other leakage losses from the heating system and is replaced at the heating plant with suitable makeup water.

ACCESSORIES

The accessories for vessel 6 include a steam pressure gauge, a water level gauge glass, a safety valve, a drain and heat insulation. Vessel 19 is supplied with a gauge glass, a thermometer to indicate the temperature of the water and a drain. Pressure gauges are installed to indicate the vacuum pressure in the upper part of pipe 16, and the pressures controlled by back pressure control valves 13 and 14. The room temperature control thermostats (or equivalent) 41 to 45 are provided with thermometers, and insulation is applied to piping as required.

ADJUSTMENTS

Before the heating system is put into service it is tested and corrections, as required, are made for assurance that it is free from leakage. Air from the steam-heated section is removed by flushing it out with steam. The initial water seal in pipe 16 is supplied from an external source.

The set points of the steam pressure controller 7, thermostats 41 to 45, and the back pressure control valves 13 and 14 are adjustable. Raising the steam pressure in vessel 6 increases the proportion of the heat in the hot water and, conversely, lowering the pressure increases the proportion of heat supplied by the steam. The radiators may be provided with valves for local room temperature adjustment.

ADVANTAGES

A heating system for high-rise buildings constructed according to this invention has many advantages over heating systems of prior art, some of which are:

1. Steam for heating the upper levels of a high-rise building and hot water for heating the lower levels may be obtained directly from an HTW heating system.
2. The steam-heated radiators may be designed for any desirable range of operating temperatures down to normal room temperature, the corresponding vacuum pressures being maintained by a water seal of a height determined by inherently automatic regulation.
3. Steam traps for returning condensate from the steam-heated radiators to the heating system are not required, thus reducing the cost of the heating equipment and preventing the loss of steam common to systems in which radiator steam traps are used.
4. Assuming steam-heated radiators and their pipe connections to be drained towards the down pipe, the combination of steam and water in them required to produce water hammer is impossible to obtain.
5. The water taken from the HTW heating system is returned to it with no loss of water (except for an insignificant vapor loss) and with no loss of heat other than what is used for space heating.
6. This method of heating the upper levels of a high-rise building with steam and the lower levels with hot water has inherent economical advantages that reduce the cost of equipment required.

MODIFICATIONS

The preferred embodiments of the invention have been described in detail. Modifications may, however, be made. For example:

1. Design details of the combined flash tank and steam separator, vessel 6, may be altered. The steam separator might be a separate item of conventional design.
2. Pump 15, of a suitable type, may be made independent of vessel 6 provided means is used to prevent flash steam, resulting from the drop in pressure at its intake, interfering with normal operation. Locating the pump at a lower level would serve this purpose. FIG. 4 shows this arrangement. Assuming the pump to be a positive displacement type, relief valve 27 serves to limit its discharge pressure.
3. Liquid level controller 8, vessel 6, may be a float-operated valve with which pipe 17 and the lower part of vessel 6 are connected, thus removing control valve 9.
4. The automatic control apparatus may be altered to suit various heating requirements.
5. Vessel 6 may also be used as the source of steam or hot water for heating an adjacent building.

It will be understood that various modifications in addition to those above mentioned can be made in the specific embodiments disclosed without departing from the spirit of the invention or the scope of the claims.

I claim:

1. An HTW heating system for a high-rise building having several levels comprising means for producing high-temperature water, means for separating said water into a steam portion and a hot water portion, means for heating spaces of the upper levels of the said building with said steam portion and means for heating spaces of the lower levels with said hot water portion, means for controlling the temperature of said heated spaces and back pressure controlled means for returning the said water to said system.

2. An HTW heating system according to claim 1, wherein the proportions of steam and hot water are determined by the controlled steam pressure.

3. HTW system according to claim 1, including means for adjusting the proportion of heat supplied to separate spaces.

4. A process for heating a high-rise building which comprises discharging high-temperature water from an HTW heating system into a vessel maintained at a relatively low pressure, thus dividing the high-temperature water into flash steam and hot water at saturation temperature, heating the upper levels with the flash steam and heating the lower levels of a high building with the hot water, discharging the condensate from the steam-heated radiators and the water from the hot water radiators through back pressure control valves into a vessel maintained at atmospheric pressure, and pumping the mixture of condensate and hot water back into the HTW heating system.

5. A process according to claim 4 whereby a surplus of hot water is provided, the said surplus of hot water being discharged directly into the said vessel receiving the condensate from the steam-heated radiators and the water from the hot-water-heated radiators.

6. An HTW system according to claim 1, including means for returning a controlled amount of said hot water portion directly into said system.

7. An HTW heating system according to claim 1, including automatic control devices for regulating (a) the steam pressure and water level in the vessel into which the high-temperature water from the HTW heating system is discharged (b) the temperature of the heated spaces and (c) the water level in the vessel receiving the condensate from the steam heated radiators.